Patented May 13, 1952

2,596,660

UNITED STATES PATENT OFFICE 2,596,660

NITRODIPHENYLAMINE PHOSPHORUS DYE COMPOUNDS

Joseph B. Dickey, Rochester, N. Y., assignor to Eastman Kodak Company, Rochester, N. Y., a corporation of New Jersey No Drawing. Application June 3, 1950, Serial No. 166,065

7 Claims. (Cl. 260—461)

1

This invention relates to new nitrodiphenylamine phosphorus dye compounds and their application to the art of dyeing or coloring.

The new diphenylamine dye compounds of my invention have the general formula:

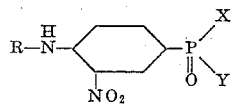

wherein R represents a monocyclic aryl nucleus of the benzene series and X and Y each represents a hydroxyl group, an -o-alkali forming metal group, an —ONH4 group, an alkoxy group having 1 to 4, inclusive, carbon atoms, an amino group or an

group, wherein $R_1$ and $R_2$ each represents an alkyl group having 1 to 4, inclusive, carbon atoms, a hydroxyalkyl group having 1 to 4, inclusive, carbon atoms or an alkoxyalkyl group having 3 to 4, inclusive, carbon atoms.

Depending upon their particular formula, the new dye compounds of my invention color a considerable number of materials yellow shades. Those compounds which are free of a sulfonic acid group yield yellow dyeings on textile materials made of or containing a cellulose alkyl carboxylic acid ester having two to four carbon atoms in the acid groups thereof which have very good fastness to light and gas. These nonsulfonated dye compounds are especially of importance in connection with the coloration of cellulose acetate textile materials. Additionally, they are useful as dyes for silk, wool, nylon, fibers from protein or protein-like materials and plastics and lacquers derived, for example, from vinyl polymers or cellulose esters or ethers. The sulfonated compounds of my invention possess little or no utility for the coloration of cellulose alkyl carboxylic acid ester materials but are useful for the coloration of the other materials mentioned hereinbefore.

It is an object of my invention to provide new nitrodiphenylamine phosphorus dye compounds. Another object is to provide a satisfactory process for the preparation of the new nitrodiphenylamine phosphorus dye compounds. A further object is to provide dyed cellulose alkyl carboxylic acid ester textile materials which possess unusually good fastness to light and gas. A particular object is to provide new nitrodiphenyl-

2 amine phosphorus dye compounds which are of especial value for the dyeing of cellulose acetate textile materials. A still further object is to provide dyed cellulose acetate textile materials which possess unusually good fastness to light and gas.

By cellulose alkyl carboxylic acid esters having two to four carbon atoms in the acid groups thereof, I mean to include, for example, both hydrolyzed and unhydrolyzed cellulose acetate, cellulose propionate, cellulose butyrate, cellulose acetate-propionate and cellulose actate-butyrate.

The new nitrodiphenylamine phosphorus compounds of my invention are prepared by reacting a primary aromatic amine having the formula RNH2, wherein R has the meaning previously assigned to it, with a compound having the formula:

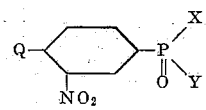

wherein Q represents a chlorine atom or a bromine atom and X and Y have the meaning previously assigned to them.

Illustrative -o-alkali forming metal groups include, for example, the —ONa group, the —OK group, the —OCa/2 group and the —OLi group.

Primary aromatic amines that are used in the preparation of the new nitrodiphenylamine phosphorus compounds of the invention include, for example, aniline, o-, m- and p-methoxyaniline, o-, m- and p-ethoxyaniline, o-, m- and p-n-propoxyaniline, o-, m- and p-n-butoxyaniline, o-, m- and p-toluidine, o-, m- and p-aminoethylbenzene, o-, m- and p-aminopropylbenzene, o-, m- and p-aminobutylbenzene, m-aminoisopropylbenzene, p-aminophenylethylalcohol, o-aminophenylethylalcohol, p-aminophenyl-β-hydroxyethylether, o-, m- and p-chloroaniline, o-, m- and p-bromoaniline, o-, m- and p-bromoaniline, o-, m- and p-fluoroaniline, o-, m- and p-aminotrifluoro methylbenzene, o-, m- and p-aminobenzoic acid, 1 - amino - 2 - methoxy-5-methylbenzene, o-, m- and p-aminobenzoic acid amide, 2,4-dichloroaniline, 2,4-dibromoaniline, o-, m and p-aminobenzenesulfonic acid and o-, m- and p-aminobenzenesulfonamide.

For purposes of clarity, it is here noted that the expression "a monocyclic aryl nucleus of the benzene series" does not and is not intended to include nuclei containing more than one benzene ring.

The following examples illustrate the com-

Example 1

20 grams of aniline, 20 grams of sodium carbonate and 200 cc. of water are heated together to refluxing conditions and 24 grams of 4-chloro-3-nitrophosphonic acid having the formula:

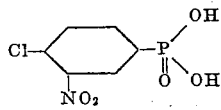

are added portionwise over a period of one hour while refluxing and refluxing is continued until the evolution of carbon dioxide ceases. Then the unreacted aniline present in the reaction mixture is removed by steam distillation, following which most of the water present in the reaction mixture is removed by distillation under reduced pressure (e. g. 1–15 mm.). The disodium salt of 4-anilino-3-nitrophenylphosphonic acid crystallizes out as a yellow compound and is recovered by filtration. It has the formula:

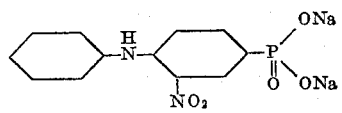

By the use of an equivalent molecular weight of potassium carbonate or ammonium carbonate in place of sodium carbonate, the corresponding potassium and ammonium salt form of the dye is obtained. The free acid form can be obtained by means of treatment with sulfuric acid.

Example 2

By the use of 23 grams of p-toluidine in place of aniline in Example 1, the disodium salt of 4-(4'-methylanilino) - 3 - nitrophenylphosphonic acid is obtained as a yellow compound. It has the formula:

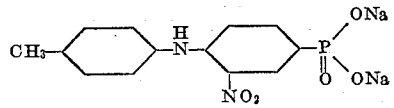

The free acid form can be obtained by means of treatment with sulfuric acid.

Example 3

26 grams of 4-chloro-3-nitrophenylphosphonic acid dimethylester and 8.5 grams of sodium bicarbonate are added to 100 cc. of aniline and the reaction mixture resulting is heated at about 120° C. until carbon dioxide ceases to be evolved. Then the unreacted aniline present in the reaction mixture is removed by steam distillation, following which the reaction mixture is filtered to obtain the desired dye compound. The precipitate collected on the filter is crystallized from ethyl alcohol to obtain the dimethylester of 4-anilino-3-nitrophenylphosphonic acid having the formula:

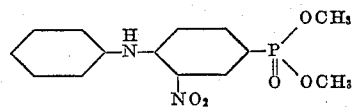

in purified form.

Example 4

30 grams of the N,N-bis-dimethylamide of 4-chloro-3-nitrophenylphosphonic acid having the formula:

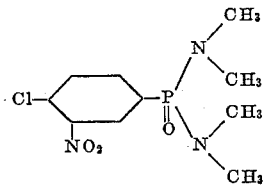

and 8.5 grams of sodium bicarbonate are added to 100 cc. of aniline and the reaction mixture resulting is heated at about 120° C. until the evolution of carbon dioxide ceases. Then the unreacted aniline present in the reaction mixture is removed by steam distillation, following which the reaction mixture is filtered to obtain the desired dye compound. The precipitate which collects on the filter is crystallized from ethyl alcohol or propyl alcohol to obtain the N,N-bis-dimethylamide of 4-anilino-3-nitrophenylphosphonic acid having the formula:

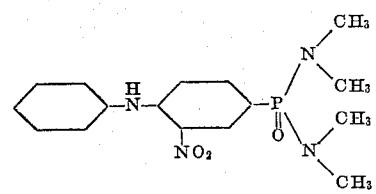

in purified form.

Example 5

By the use of 100 cc. of p-ethoxyaniline in place of aniline in Example 4, the N,N-bis-dimethylamide of 4 - (4'-ethoxyanilino) - 3 - nitrophenylphosphonic acid having the formula:

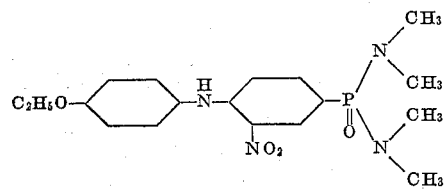

is obtained.

Example 6

30 grams of

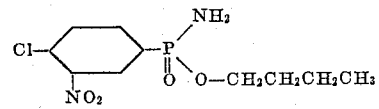

and 8.5 grams of sodium bicarbonate are added to 100 cc. of aniline and the reaction mixture resulting is heated at about 120° C. until no more carbon dioxide is evolved. Then the unreacted aniline present in the reaction mixture is removed by steam distillation, following which the reaction mixture is filtered to obtain the desired dye compound. The precipitate collected on the filter is crystallized from ethyl alcohol to obtain

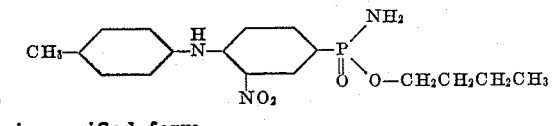

in purified form.

Example 7

By the use of 27 grams of the methyl, ethyl ester of 4-chloro-3-nitrophenylphosphonic acid in place of the dimethylester of 4-chloro-3-nitrophosphonic acid in Example 3,

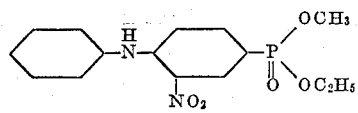

is obtained as a yellow compound.

Example 8

By the use of 30 grams of the di-n-butylester of 4-chloro-3-nitrophenylphosphonic acid in place of the dimethylester of 4-chloro-3-nitrophosphonic acid in Example 3,

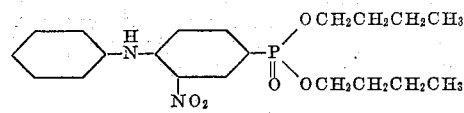

is obtained as a yellow compound.

Example 9

By the use of an equivalent molecular weight of the diethyl ester of 4-chloro-3-nitrophenylphosphonic acid in place of the dimethyl ester of 4-chloro-3-nitrophenylphosphonic acid in Example 3, the corresponding diethyl ester dye compound is obtained as a yellow compound.

Example 10

20 grams of the methyl ester of 4-chloro-3-nitrophenylphosphonamide having the formula:

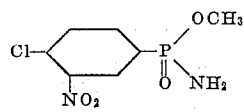

and 8.5 grams of sodium bicarbonate are reacted with 100 cc. of aniline in accordance with the procedure described in Example 3 to obtain

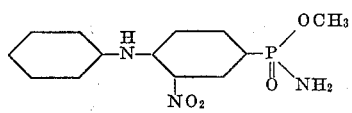

a yellow dye compound.

Example 11

24 grams of 4-chloro-3-nitrophenylphosphondiamide and 8.5 grams of sodium bicarbonate are reacted with 100 cc. of aniline in accordance with the procedure described in Example 3 to obtain:

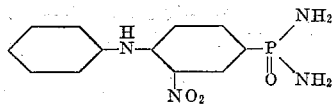

a yellow dye compound.

Example 12

By the use of 100 cc. of p-toluidine in place of aniline in Example 4, the N, N-bis-dimethylamide of 4-(4'-methylanilino)-3-nitrophenylphosphonic acid is obtained.

Example 13

40 grams of p-aminobenzenesulfonic acid, 20 grams of sodium carbonate and 200 cc. of water are reacted with 24 grams of 4-chloro-3-nitrophenylphosphonic acid in accordance with the procedure described in Example 1. The dye compound

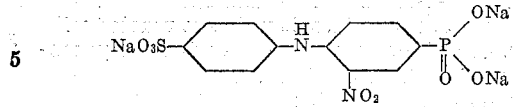

is obtained. The free acid form can be obtained by means of treatment with sulfuric acid.

Example 14

38 grams of o-aminobenzenesulfonic acid, 20 grams of sodium carbonate and 200 cc. of water are reacted with 27.1 grams of the dimethylester of 4-chloro-3-nitrophenylphosphonic acid in accordance with the procedure described in Example 1. The dye compound

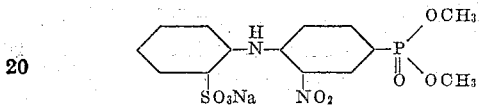

is obtained.

Example 15

20 grams of 4-chloro-3-nitrophenylphosphon-mono-N-n-butylamide are reacted with 20 grams of aniline in accordance with the procedure described in Example 1. The dye compound obtained has, in its free acid form, the formula:

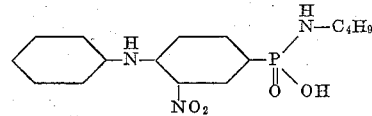

Example 16

40 grams of the N,N-bis-β-hydroxyethylamide of 4-chloro-3-nitrophenylphosphonic acid and 8.5 grams of sodium bicarbonate are added to 100 cc. of aniline and the reaction mixture resulting is heated at about 120° C. until the evolution of carbon dioxide ceases. Then the unreacted aniline present in the reaction mixture is removed by steam distillation, following which the reaction mixture is filtered to obtain the desired dye compound. The precipitate which collects on the filter is crystallized from ethyl alcohol or propyl alcohol to obtain the N,N-bis-β-hydroxyethylamide of 4-anilino-3-nitrophenylphosphonic acid having the formula:

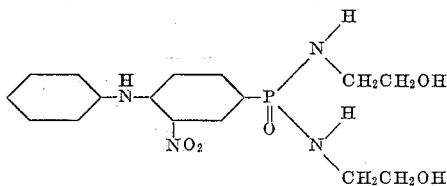

in purified form.

Example 17

42 grams of the N,N-bis-β-ethoxyethylamide of 4-chloro-3-nitrophenylphosphonic acid and 8.5 grams of sodium bicarbonate are reacted with 100 cc. of aniline in accordance with the procedure described in Example 16. The dye compound obtained has the formula:

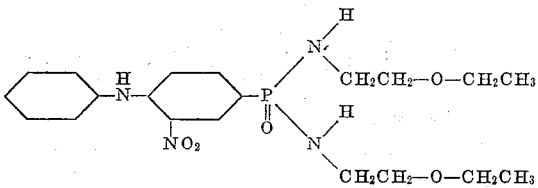

Example 18

45 grams of the N,N-bis-δ-hydroxybutylamide of 4-chloro-3-nitrophenylphosphonic acid and 8.5 grams of sodium bicarbonate are reacted with 100 cc. of aniline in accordance with the procedure described in Example 16. The dye compound obtained has the formula:

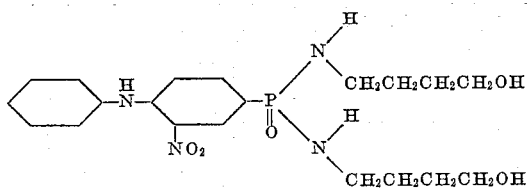

Example 19

26 grams of 4-chloro-3-nitrophenylphosphonic acid dimethylester are reacted with 100 cc. of p-n-butoxyaniline in accordance with the procedure described in Example 3. The dye compound obtained has the formula:

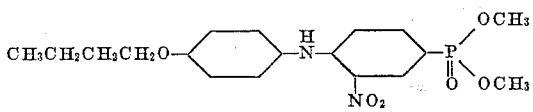

Example 20

30 grams of 4-chloro-3-nitrophenylphosphonic acid di-n-propyl ester are reacted with 100 cc. of p-amino-n-butylbenzene in accordance with the procedure described in Example 3. The dye compound obtained has the formula:

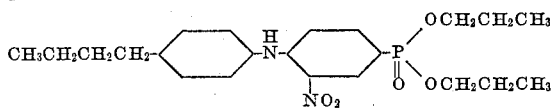

Following the precedure described hereinbefore, the following compounds are readily prepared:

Example 21

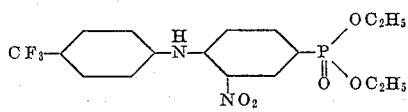

Example 22

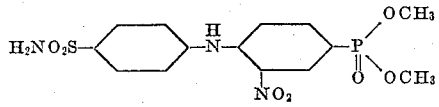

Example 23

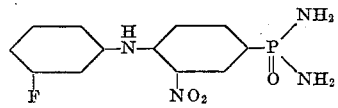

Example 24

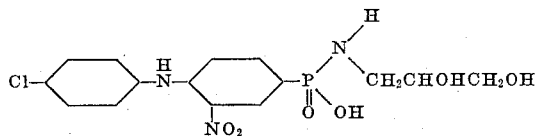

Example 25

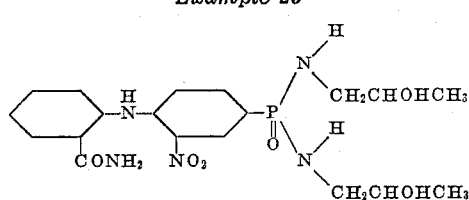

Example 26

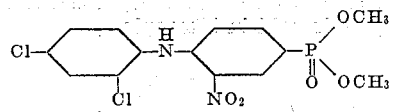

and

Example 27

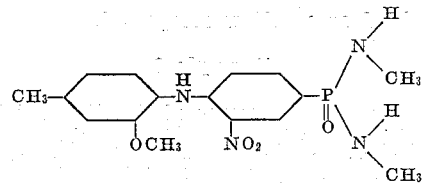

In order that the preparation of the compounds of my invention may be entirely clear, the preparation of certain intermediates used in their manufacture is described hereinafter.

Example 28

27.4 grams of 4-chloro-3-nitrophenylphosphonic acid are placed in 100 cc. of phosphorus oxychloride and 25 grams of phosphorus pentachloride are added portionwise. The reaction which takes place is completed by warming on a water bath and then the phosphorus oxychloride is removed by distilling under reduced pressure (e. g. 1–10 mm.). 200 cc. of iced water are then added to the reaction mixture and the reaction product is taken up with benzene. 4-chloro-3-nitrophenylphosphonic acid dichloride having the formula:

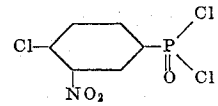

is obtained by crystallization from the benzene.

The method above described is similar to that used by Michaelis, Annalen 181, 314 for preparing phenylphosphonic acid dichloride $$(C_6H_5 \cdot PCl_2)$$
$$\parallel$$
$$O$$

Compounds having the formula:

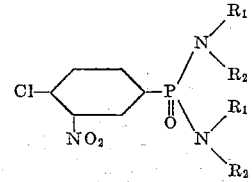

wherein $R_1$ and $R_2$ each represents a hydrogen atom, an alkyl group having 1 to 4, inclusive, carbon atoms, a hydroxyalkyl group having 1 to 4, inclusive, carbon atoms or an alkoxyalkyl group having 1 to 4, inclusive, carbon atoms are prepared by reacting 4-chloro-3-nitrophenylphosphonic acid dichloride with an amine compound having the formula:

$$HN\begin{matrix}R_1\\R_2\end{matrix}$$

The materials should be reacted together in the ratio of at least two molecular equivalent weights of the amine to one molecular equivalent weight of the acid dichloride.

Example 29

10 grams of 4-chloro-3-nitrophenylphosphonic acid dichloride are dissolved in 100 cc. of acetone and then an excess of ammonium hydroxide is added at 10° C. The reaction mixture is stirred at 10° C. for 4 hours and then poured into water. 4-chloro-3-nitrophenylphosphondiamide having the formula:

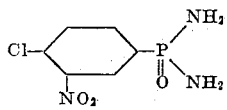

precipitates as a white crystalline solid and is recovered by filtration.

Example 30

10 grams of 4-chloro-3-nitrophenylphosphonic acid dichloride are dissolved in 50 cc. of ethyl alcohol and heated until no more hydrogen chloride is evolved. The ethyl alcohol is removed by distillation and then the residue remaining is distilled under a reduced pressure of 1-2 mm. to obtain the diethylester of 4-chloro-3-nitrophenylphosphonic acid.

By the use of methyl alcohol, n-propyl alcohol, isopropyl alcohol or n-butyl alcohol, for example, in place of ethyl alcohol, the corresponding dimethyl, di-n-propyl, diisopropyl or di-n-butyl ester, respectively, of 4-chloro-3-nitrophenylphosphonic acid is obtained.

Example 31

10 grams of 4-chloro-3-nitrophenylphosphonic acid dichloride are dissolved in 100 cc. of pyridine and .7 gram of water (1 molecular equivalent of the acid dichloride) is added and the reaction mixture is warmed to 50° C.-75° C. for a few minutes and then cooled. By this treatment

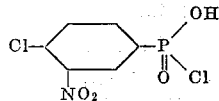

is formed.

Example 32

5 grams of ethylamine are added to the reaction mixture formed in Example 31. The reaction mixture is warmed to 50° C. and maintained at this temperature for about 30 minutes after which it is poured into water. 4-chloro-3-nitrophenylphosphonic acid N-ethylamide having the formula:

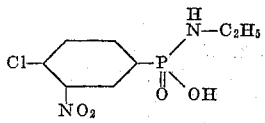

precipitates and is recovered by filtration.

Example 33

10 grams of 4-chloro-3-nitrophenylphosphonic acid dichloride are dissolved in 100 cc. of pyridine and 1.18 grams of methyl alcohol (1 molecular equivalent of the acid dichloride) in 10 cc. of pyridine are added thereto and the reaction mixture is warmed to 50° C.-75° for 1 hour. The methyl ester of 4-chloro-3-nitrophenylphosphonic acid monochloride having the formula:

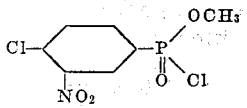

is formed. (This compound can be precipitated from the reaction mixture by pouring the reaction mixture into ice-cold water, after which the compound is recovered by filtration.)

Example 34

.7 gram of water (1 molecular equivalent of the phenylphosphonic acid compound) is added to the reaction mixture obtained as described in Example 33 and the reaction mixture is heated to 50° C.-75° C. for 1 hour. The methyl ester of 4-chloro-3-nitrophenylphosphonic acid having the formula:

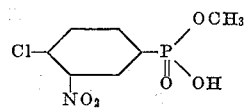

is formed. It is precipitated from the reaction mixture by pouring the reaction mixture into ice-cold water, after which it is recovered by filtration.

Example 35

6 grams of dimethylamine are added to the reaction mixture obtained as described in Example 33 and the reaction mixture resulting is heated, with stirring, at 50° C.-75° C., for 1 hour. The methyl ester of 4-chloro-3-nitrophenylphosphonic acid -N-bis-dimethylamide having the formula:

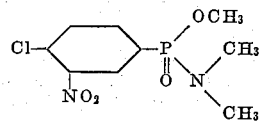

is formed. It is precipitated from the reaction mixture by pouring the reaction mixture into ice-cold water, after which it is recovered by filtration, washed with cold water and dried.

Example 36

10 grams of 4-chloro-3-nitrophenylphosphonic acid dichloride are dissolved in 100 cc. of acetone and 10 grams of ethanolamine are added. The reaction mixture is warmed to 50° C.-75° C., stirred at this temperature for 1 hour and then poured into ice-cold water. The N,N-bis-β-hydroxyethylamide of 4-chloro - 3 - nitrophenylphosphonic acid having the formula:

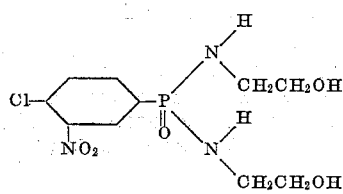

precipitates and is recovered by filtration.

Example 37

By the use of 14 grams of β-ethoxyethylamine in place of ethanolamine in Example 36, the N,N-bis -β- ethoxyethylamide of 4 - chloro -3- nitrophenylphosphonic acid is obtained.

Example 38

By the use of 8 grams of dimethylamine in place of ethanolamine in Example 35, the N,N-bis-dimethylamide of 4 - chloro - 3 - nitrophenylphosphonic acid having the formula:

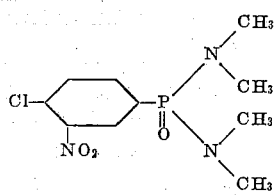

is obtained.

Example 39

10 grams of 4-chloro-3-nitrophenylphosphonic acid dichloride are dissolved in 50 cc. of methyl alcohol and the reaction mixture is heated until no more hydrogen chloride is evolved. The methyl alcohol is removed by distillation and then the residue remaining is distilled under a reduced pressure of 1–2 mm. to obtain the dimethyl ester of 4 - chloro - 3 - nitrophenylphosphonic acid.

Example 40

10 grams of 4-chloro-3-nitrophenylphosphonic acid dichloride are dissolved in 50 cc. of n-butyl alcohol and the reaction mixture is heated until no more hydrogen chloride is evolved. The n-butyl alcohol is removed by distillation and then the residue remaining is distilled under a reduced pressure of 1–2 mm. to obtain the di-n-butyl ester of 4-chloro-3-nitrophenylphosphonic acid.

Example 41

10 grams of 4-chloro-3-nitrophenylphosphonic acid dichloride are dissolved in 50 cc. of n-propyl alcohol and the reaction mixture is heated until no more hydrogen chloride is evolved. The n-propyl alcohol is removed by distillation and then the residue remaining is distilled under a reduced pressure of 1–2 mm. to obtain the di-n-propyl ester of 4-chloro-3-nitrophenylphosphonic acid.

Example 42

10 grams of 4-chloro-3-nitrophenylphosphonic acid dichloride are dissolved in 100 cc. of pyridine and 2.74 grams of n-butyl alcohol (1 molecular equivalent of the acid dichloride) in 10 cc. of pyridine are added thereto and the reaction mixture is warmed to 50° C.–75° C. for 1 hour. The n-butyl ester of 4-chloro-3-nitrophenylphosphonic acid monochloride is formed. (This compound can be precipitated from the reaction mixture by pouring the reaction mixture into ice-cold water after which the compound is recovered by filtration.)

Example 43

The reaction mixture obtained as described in Example 42 and 3 grams of ammonia are heated together with shaking in an autoclave at 50° C.–75° C. for 1 hour. The n-butyl ester of 4-chloro-3-nitrophenylphosphonmonoamide having the formula:

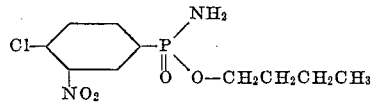

is formed. It is precipitated from the reaction mixture by pouring the reaction mixture into ice-cold water after which it is recovered by filtration, washed with cold water, and dried.

Example 44

The reaction mixture obtained as described in Example 33 is heated to 50° C.–75° C. for 1 hour with 3 grams of ethyl alcohol. The methyl, ethyl ester of 4-chloro-3-nitrophenylphosphonic acid is formed. It is precipitated from the reaction mixture by pouring the reaction mixture into ice-cold water after which it is recovered by filtration, washed with cold water, and dried.

Example 45

The reaction mixture obtained as described in Example 33 is heated in an autoclave with 3 grams of ammonia at 50° C.–75° C. for 1–2 hours. The methyl ester of 4-chloro-3-nitrophenylphosphonamide is formed. It is precipitated from the reaction mixture by pouring the reaction mixture into ice-cold water after which it is recovered by filtration, washed with cold water, and dried.

Example 46

10 grams of n-butylamine are added to the reaction mixture formed in Example 31 and the reaction mixture is warmed to 50° C. and maintained at this temperature for about 30 minutes after which it is poured into water. 4-chloro-3-nitrophenylphosphonmono-N-n-butylamide precipitates and is recovered by filtration.

Example 47

10 grams of 4-chloro-3-nitrophenylphosphonic acid dichloride are dissolved in 100 cc. of acetone and 20 grams of n-butanolamine are added. The reaction mixture formed is warmed to 50° C.–75° C., stirred at this temperature for 1 hour and then poured into ice-cold water. The N,N-bis-δ-hydroxybutylamide of 4-chloro-3-nitrophenylphosphonic acid precipitates and is recovered by filtration.

Example 48

10 grams of 4-chloro-3-nitrophenylphosphonic acid dichloride are dissolved in 100 cc. of acetone and 20 grams of 2,3-dihydroxypropylamine are added. The reaction mixture is warmed to 50° C.–75° C., stirred at this temperature for 1 hour and then poured into ice-cold water. The N,N-bis-β,γ-dihydroxypropylamide of 4-chloro-3-nitrophenylphosphonic acid precipitates and is recovered by filtration.

Example 49

10 grams of 2,3-dihydroxypropylamine are added to the reaction mixture formed in Example 31. The reaction mixture is warmed to 50° C. and maintained at this temperature for about 30 minutes after which it is poured into water. 4-chloro-3-nitrophenylphosphonic acid N-2,3-dihydroxypropylamide having the formula:

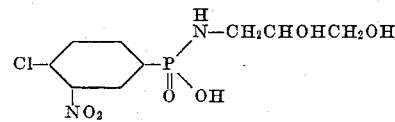

precipitates and is recovered by filtration.

The nitrodiphenylamine phosphorus dye compounds of my invention can be applied to the textile materials named hereinbefore in the form of an aqueous dispersion and are ordinarily so applied. To illustrate, the dye compound is finely ground with a dispersing agent such as sodium lignum sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dye bath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dye bath, washed with an aqueous soap solution, rinsed well with water and dried.

The procedure just described is applicable whether the dye compound contains a sulfonic acid group or not. The dye compounds of the invention not containing a sulfonic acid group are, for the most part, practically water-insoluble. Where a sulfonic acid group is present, the water solubility is increased and in such case a greater amount of the dye will go into solution.

Widely varying amounts of dye can be used in the dyeing operation. The amount of dye used can be, for example, ⅓ to 3% (by weight) of that of the textile material although lesser or greater amounts of dye can be employed.

I claim:

1. The diphenylamine compounds having the general formula:

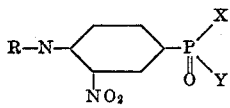

wherein R represents a monocyclic aryl nucleus of the benzene series and X and Y each represents a member selected from the group consisting of a hydroxyl group, an -o-alkali forming metal group, an —ONH4 group, an alkoxy group having 1 to 4, inclusive, carbon atoms, an amino group and an

group, wherein R₁ and R₂ each represents a member selected from the group consisting of an alkyl group having 1 to 4, inclusive, carbon atoms, a hydroxylalkyl group having 1 to 4, inclusive, carbon atoms and an alkoxyalkyl group having 3 to 4, inclusive, carbon atoms.

2. The diphenylamine compounds having the general formula:

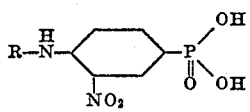

wherein R represents a monocyclic aryl nucleus of the benzene series and the alkali and ammonium salts thereof.

3. The diphenylamine compounds having the general formula:

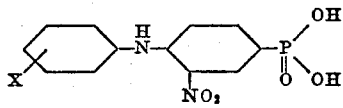

wherein X represents an alkoxy group having 1 to 4, inclusive, carbon atoms and the alkali and ammonium salts thereof.

4. The diphenylamine compounds having the general formula:

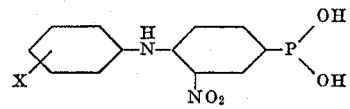

wherein X represents an alkyl group having 1 to 4, inclusive, carbon atoms and the alkali and ammonium salts thereof.

5. The diphenylamine compound having the formula:

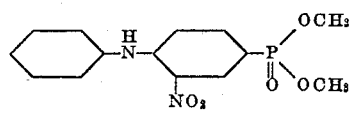

6. The diphenylamine compound having the formula:

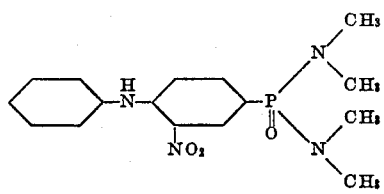

7. The diphenylamine compound having the formula:

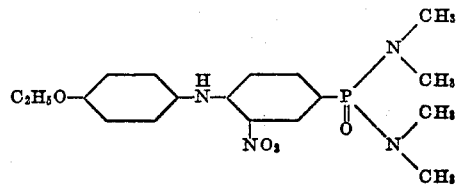

JOSEPH B. DICKEY.

REFERENCES CITED

The following references are of record in the file of this patent:

UNITED STATES PATENTS

| Number | Name | Date |
|---|---|---|
| 1,618,415 | Ellis | Feb. 22, 1927 |
| 1,947,038 | Ellis | Feb. 13, 1934 |
| 2,200,343 | Ritter | May 14, 1940 |
| 2,474,333 | Seymour | June 28, 1949 |